United States Patent [19]
Gearin et al.

[11] Patent Number: 5,105,951
[45] Date of Patent: Apr. 21, 1992

[54] FRAME FOR TRANSPORTING WHEELED VEHICLES

[75] Inventors: Peter Gearin, Portland; Everett A. Leech, Clackamas, both of Oreg.

[73] Assignee: G & G Intellectual Properties, Inc., Portland, Oreg.

[21] Appl. No.: 720,893

[22] Filed: Jun. 25, 1991

Related U.S. Application Data

[63] Continuation of Ser. No. 500,476, Mar. 28, 1990, Pat. No. 5,040,936, which is a continuation of Ser. No. 261,504, Oct. 24, 1988, Pat. No. 4,963,067, which is a continuation-in-part of Ser. No. 943,688, Dec. 18, 1986, Pat. No. 4,797,049.

[51] Int. Cl.⁵ ............................................. A47F 5/00
[52] U.S. Cl. .................................... 211/13; 211/191; 414/572; 414/400; 414/786
[58] Field of Search ............... 414/341, 343, 345, 352, 414/353, 389, 390, 395, 398–400, 495, 496, 498–500, 585, 679, 786, 542, 572; 410/3, 4, 13, 7-9, 14, 16, 18, 30, 23-26, 29.1; 211/175, 191, 13

[56] References Cited

U.S. PATENT DOCUMENTS

| | | |
|---|---|---|
| 1,247,553 | 11/1917 | Linquist et al. |
| 1,869,054 | 7/1932 | Evans |
| 2,016,430 | 10/1935 | Hice |
| 2,098,184 | 11/1937 | Fehr et al. |
| 2,492,829 | 12/1949 | Baker |
| 3,043,454 | 7/1962 | Butler et al. |
| 3,498,480 | 3/1970 | Gutridge |
| 3,667,635 | 6/1972 | Hackney |
| 3,675,795 | 7/1972 | Dluhy |
| 4,124,119 | 11/1978 | Nordstrom |
| 4,455,119 | 6/1984 | Smith |
| 4,597,712 | 7/1986 | Smith |
| 4,624,188 | 11/1986 | Kaleta |
| 4,668,141 | 5/1987 | Petersen |
| 4,668,142 | 5/1987 | Fity et al. |

FOREIGN PATENT DOCUMENTS

| | | |
|---|---|---|
| 961699 | 1/1975 | Canada |
| 1135782 | 8/1962 | Fed. Rep. of Germany |
| 1202387 | 1/1960 | France |
| 1006496 | 10/1965 | United Kingdom |
| 8101997 | 7/1981 | World Int. Prop. O. |

Primary Examiner—Robert W. Gibson, Jr.
Attorney, Agent, or Firm—Chernoff, Vilhauer, McClung & Stenzel

[57] ABSTRACT

A system for loading and transporting wheeled vehicles on a transporting vehicle, such as a ship or rail car, comprises supporting a plurality of wheeled vehicles on each of a plurality of frames in vertically-spaced relation to each other and then inserting the respective frames and their supported vehicles matingly into respective enclosures. The enclosures, with their frames and vehicles inside, are loaded onto the transporting vehicle by compactly stacking the enclosures one atop the other in weather-exposed positions, the enclosures nevertheless serving to protect the vehicles from external hazards.

9 Claims, 4 Drawing Sheets

FRAME FOR TRANSPORTING WHEELED VEHICLES

CROSS REFERENCE TO RELATED APPLICATION

This application is a continuation to U.S. patent application Ser. No. 500,476, filed Nov. 28, 1990, now U.S. Pat. No. 5,040,936, issued Aug. 20, 1991, which in turn is a continuation of U.S. patent application Ser. No. 261,504, filed Oct. 24, 1988, now U.S. Pat. No. 4,963,067, which in turn is a continuation-in-part of U.S. patent application Ser. No. 943,688, filed Dec. 18, 1986, now U.S. Pat. No. 4,797,049.

BACKGROUND OF THE INVENTION

This invention relates to improvements in methods and apparatus for transporting light wheeled vehicles, such as passenger cars and small trucks, on a transporting vehicle such as a ship, barge or railcar. More particularly, the invention relates to a system which enables standard, closed, dry-cargo containers, without any alteration to their structure, to enclose multiple tiers of wheeled vehicles within each container to protect such vehicles during shipment, and to support the vehicles during shipment in a very high-density, compact, many-tiered configuration to maximize the payload Many different systems are currently used for the high-volume transportation of wheeled vehicles from their points of manufacture to their ultimate markets. For example, conventional open highway trailers such as those shown in Baker U.S. Pat. No. 2,492,829, Petersen U.S. Pat. No. 4,668,141, Fity et al. U.S. Pat. No. 4,668,142 or British patent No. 1,006,496 have integral vertically-adjustable vehicle support assemblies onto which the vehicles are driven and supported at elevated positions. Alternatively, enclosed transport vehicles such as highway vans and railcars have been equipped with integral vehicle-support assemblies within their enclosures for supporting vehicles in vertically-spaced groups as shown, for example, in Linquist et al. U.S. Pat. No. 1,247,553, Hice U.S. Pat. No. 2,016,430, Fehr et al. U.S. Pat. No. 2,098,184, Gutridge U.S. Pat. No. 3,498,480, Smith U.S. Pat. Nos. 4,455,119 and 4,597,712, Canadian patent No. 961,699 and French patent No. 1,202,387. However, a problem with structures having integral vehicle-support assemblies is that they are not readily adaptable to transport goods other than vehicles, and therefore cannot be efficiently utilized for the transport of other cargo on return trips. Also, those structures which are not enclosed expose the vehicles to external hazards from weather and flying debris during shipment, while those structures which are enclosed make securing of the vehicles compactly in elevated positions within their enclosures difficult and time-consuming because of limited access, unless expensive, automatically-operated vehicle-supporting structures are provided in each enclosure.

Support racks have been employed for loading cargo onto transporting vehicles such as a van, airplane, or ship as shown, for example, in Hackney U.S. Pat. No. 3,667,635, Nordstrom U.S. Pat. No. 4,124,119, and Yonahara WIPO publication document No. 81/01997, respectively. However, if the transporting vehicle has no protective enclosure, as in the case of an open railcar or truck trailer, or the exposed upper deck of a ship, no effective protection of the cargo from external hazards such as weather, flying debris, or seawater is provided since the racks are open-sided. Such racks cannot be of enclosed construction because access must be provided to secure the cargo to the racks. Moreover, such open rack structures provide no stable means capable of stacking wheeled vehicles atop one another in numerous tiers on any transporting vehicle. Even Yonahara's structure, which is stackable, is severely limited in this regard because its open-sided construction lacks the rigidity necessary for high stacking of wheeled vehicles.

What is needed therefore is a system for loading and transporting wheeled vehicles compactly stacked in numerous tiers above one another, and yet protected from all external hazards despite the absence of any protecting structure on the transporting vehicle itself. Moreover the system should provide for the return shipment of other types of cargo in a similarly stacked and protected condition.

SUMMARY OF THE INVENTION

The present invention satisfies the foregoing needs by providing a plurality of elongate vehicle-supporting frames each matingly insertable into an unaltered, standard, portable, closed dry-cargo container or comparable elongate enclosure. Each vehicle-supporting frame has open, transversely-spaced, upright sides defining an interior space capable of supporting multiple tiers of wheeled vehicles, which are loaded onto the frames while exterior of the enclosures. Each enclosure, on the other hand, has a closed top, bottom and surrounding wall, a selectively openable and closable entryway through which a loaded frame may be inserted, and vertical posts extending between its top and bottom which, in combination with the structural diaphragm provided by the closed surrounding wall, forms a highly rigid, compression-resistant structure. The loaded enclosures, each with its multiple tiers of vehicles, can thus be placed on a transporting vehicle, such as a railcar or ship, and stacked compactly one atop the other to form a many-tiered, yet stable, arrangement of vehicles. The closed surrounding wall and posts of each enclosure not only provide the rigidity for such stacking of vehicles in numerous tiers, but also provide complete protection for the vehicles from external hazards even though an open railcar or the exposed upper deck of a ship is the means of transportation.

The loadability of each vehicle-supporting frame with multiple tiers of wheeled vehicles, while exterior of the enclosure into which it will be inserted, enables the enclosure to secure multiple tiers of vehicles despite its closed surrounding wall, since accessibility for purposes of securing the vehicles at elevated positions within the enclosure is rendered unnecessary by the open-sided, exterior loadability of the frame. Thus, the prior incompatibility between closed-sided portable enclosures, and the support of wheeled vehicles in elevated positions above one another, most clearly exemplified by the aforementioned Yonahara system, is eliminated. Moreover the previous incompatibility between high-stacking of numerous tiers of vehicles, and the use of portable open-sided stacking frames (which inherently lack the rigidity for high-stacking as also exemplified by Yonahara), is likewise solved by the marriage of the open stacking frames with the stackable enclosures.

Finally, the insertable frame's elimination of any need for the enclosures to have integral structure to secure the multiple tiers of vehicles ensures the usefulness of the same enclosures for shipping other cargo on the return trip.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
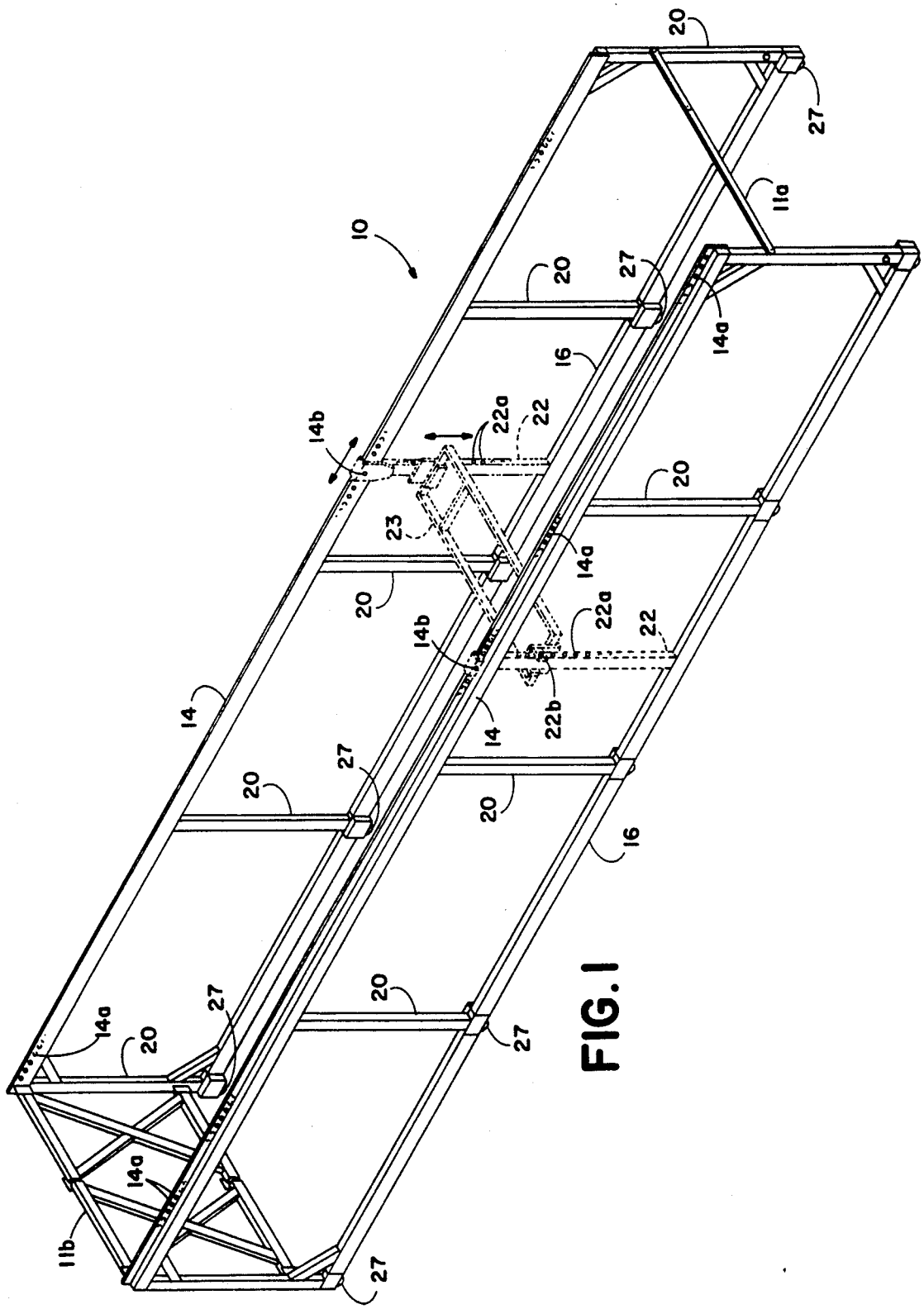
FIG. 1 is a simplified perspective view of an exemplary embodiment of a vehicle-supporting frame in accordance with the present invention.
Figure 2:
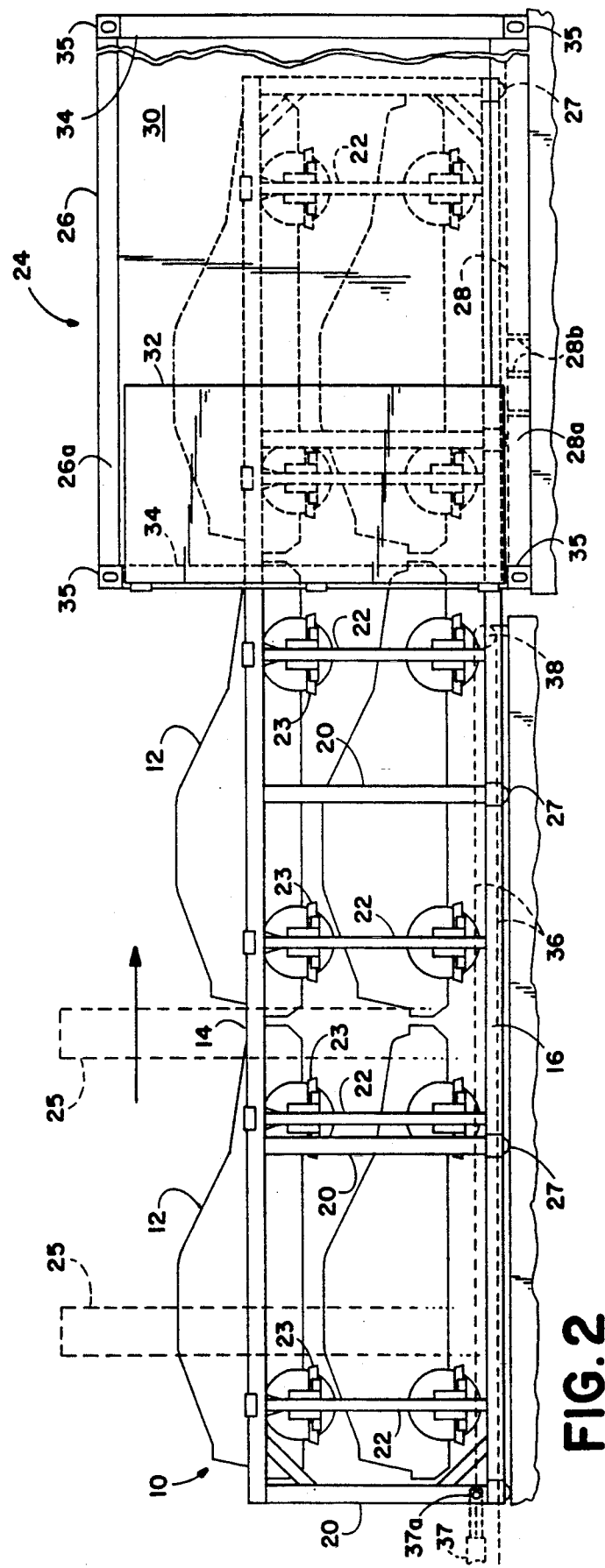
FIG. 2 is an extended side view showing the frame of FIG. 1, with two tiers of vehicles secured thereto, being inserted matingly into a standard, closed dry-cargo container.

With reference to FIGS. 1 and 2, an exemplary embodiment of the vehicle-supporting frame of the present invention, indicated generally as 10, comprises an elongate, three-dimensional, frame having transversely-spaced, elongate, open upright sides joined together at their ends by respective cross members 11a, 11b so as to form an interior space capable of enclosing at least two vertically-spaced tiers of wheeled vehicles 12 as shown in FIG. 2. Each side of the frame 10, respectively, has a top rail 14 and a bottom rail 16 with spaced columns 20 supporting the top rail vertically Suspended from each top rail 14 are respective tension members 22 (only two of which are shown in FIG. 1) adjustably movable longitudinally along the rail 14 and selectively lockable thereto by pins 14b insertable into apertures 14a. Wheel supports 23 are slidably attached to the tension members 22 so as to be vertically movable with respect thereto and selectively lockable at different elevations by pins 22b insertable into apertures 22a, each wheel support 23 extending transversely between corresponding tension members 22 on each side of the frame. The vehicles 12 may be loaded onto the frame 10 in respective upper and lower positions supported by the wheel supports 23 by any of several alternative procedures, including inserting the vehicles into the interior space of the frame from one end thereof or through the open bottom thereof between the upright sides of the frame and then raising the wheel supports by an external hoist, such as a gantry 25 (FIG. 2), to their desired elevations where they are secured to the tension members 22. This procedure is performed while the frame is exterior of any enclosure to enable access for securing the vehicles through the open sides of the frame 10. A suitable frame structure, and a gantry for loading such frame structure, are shown in U.S. Pat. No. 4,768,916 which is incorporated herein by reference.

In the system of the present invention, numerous frames 10 are utilized, each having a width and length enabling the frame 10, when loaded with the vehicles 12, to be inserted matingly into an elongate, three-dimensional, rectangular-shaped, portable enclosure indicated generally as 24 in FIG. 2. The enclosure 24 may, but need not necessarily, be a standard dry-cargo container of the type conventionally used for shipping numerous different types of cargo. Regardless of its specific type, the enclosure 24 has a closed top 26 supported by roof rails 26a, a closed bottom 28 supported by bottom rails 28a and transversely-extending cross members 28b, and a closed rigid wall 30 surrounding its sides and ends. A selectively openable and closable entryway in the wall may be provided, for example, by a pair of openable and closable hinged end doors such as 32. In addition, the enclosure 24 is equipped with a plurality of elongate compression-resistant members such as corner posts 34 and side posts (not shown) which, in combination with the rigidity provided by the closed surrounding wall 30 permanently fastened thereto, enable each loaded enclosure 24 to support one or more identical loaded enclosures 24 resting atop it. Each corner of the enclosure 24 has a connecting corner fitting 35 with elongated apertures on each of its three exposed surfaces for detachably securing the enclosure, in a known manner, to a similar enclosure below, above or to one side of it, or for securing the enclosure to a transporting vehicle or hoist.

The mating insertability of each frame 10 with respect to each enclosure 24 is such that the exterior length and width dimensions of each frame 10 are slightly smaller than the interior length and width dimensions of the enclosure 24 so that a fully-loaded frame 10 can be inserted through the open end doors 32 of a respective enclosure 24 as shown in FIG. 2 and rolled longitudinally into the enclosure 24 on rollers such as 27 mounted on the bottom rail 16 of the frame 10. Insertion (or subsequent retraction) is accomplished by a suitable power-operated apparatus such as an endless chain 36 extending along each side of the frame driving a carriage 37 which detachably engages the frame through pins such as 37a, the chains, in turn, being driven in unison by powered sprockets such as 38. After full insertion into the enclosure, the frame can then be secured against any movement relative to the enclosure by blocking it and closing the doors 32.

Figure 3:
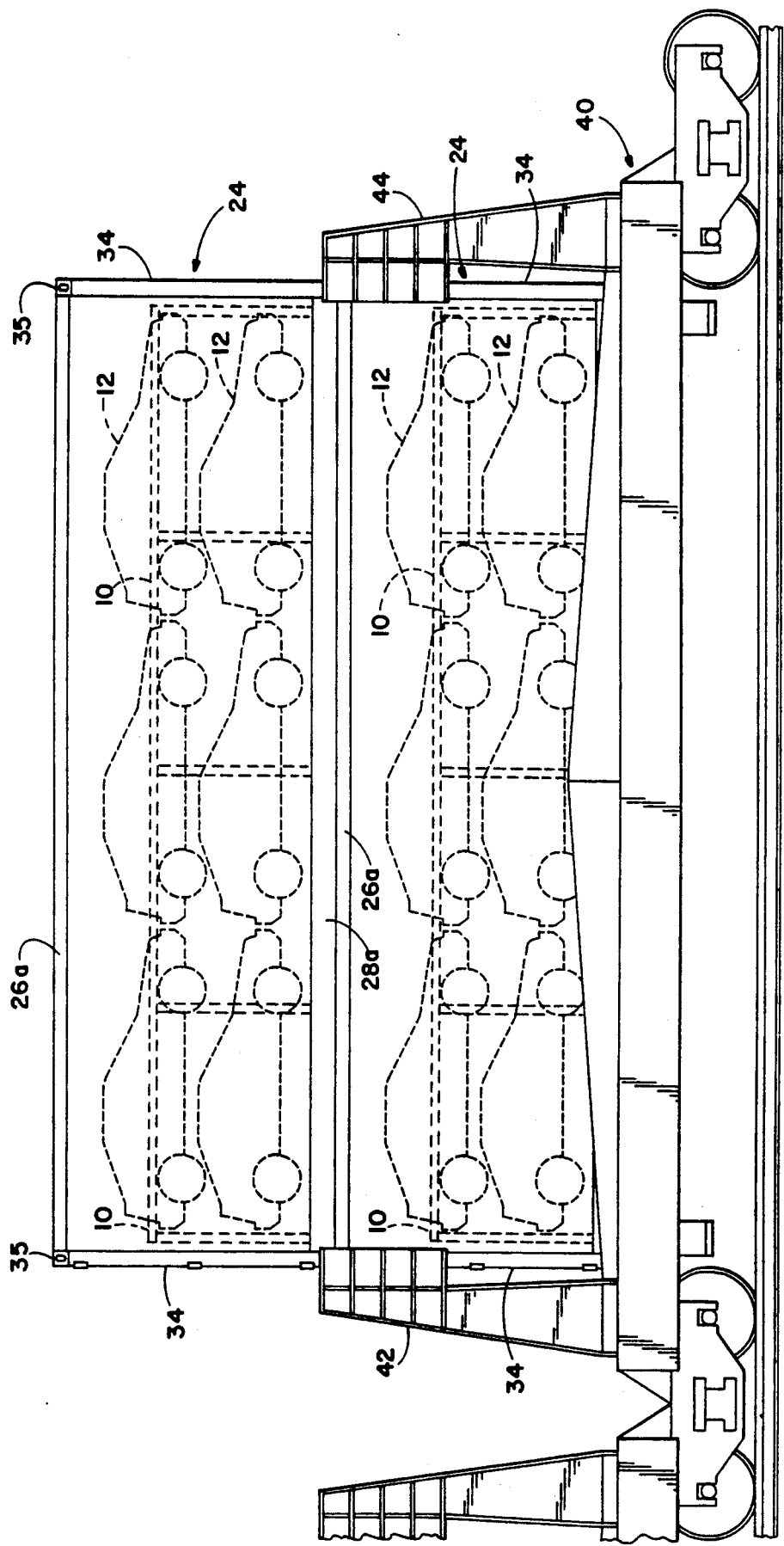
FIG. 3 is a side view of a railway car having two standard, closed dry-cargo containers stacked thereon one atop the other, each container enclosing a respective vehicle-supporting frame having two tiers of vehicles secured thereto so that the entire assembly comprises four vertically-spaced tiers of enclosed vehicles.
Figure 4:
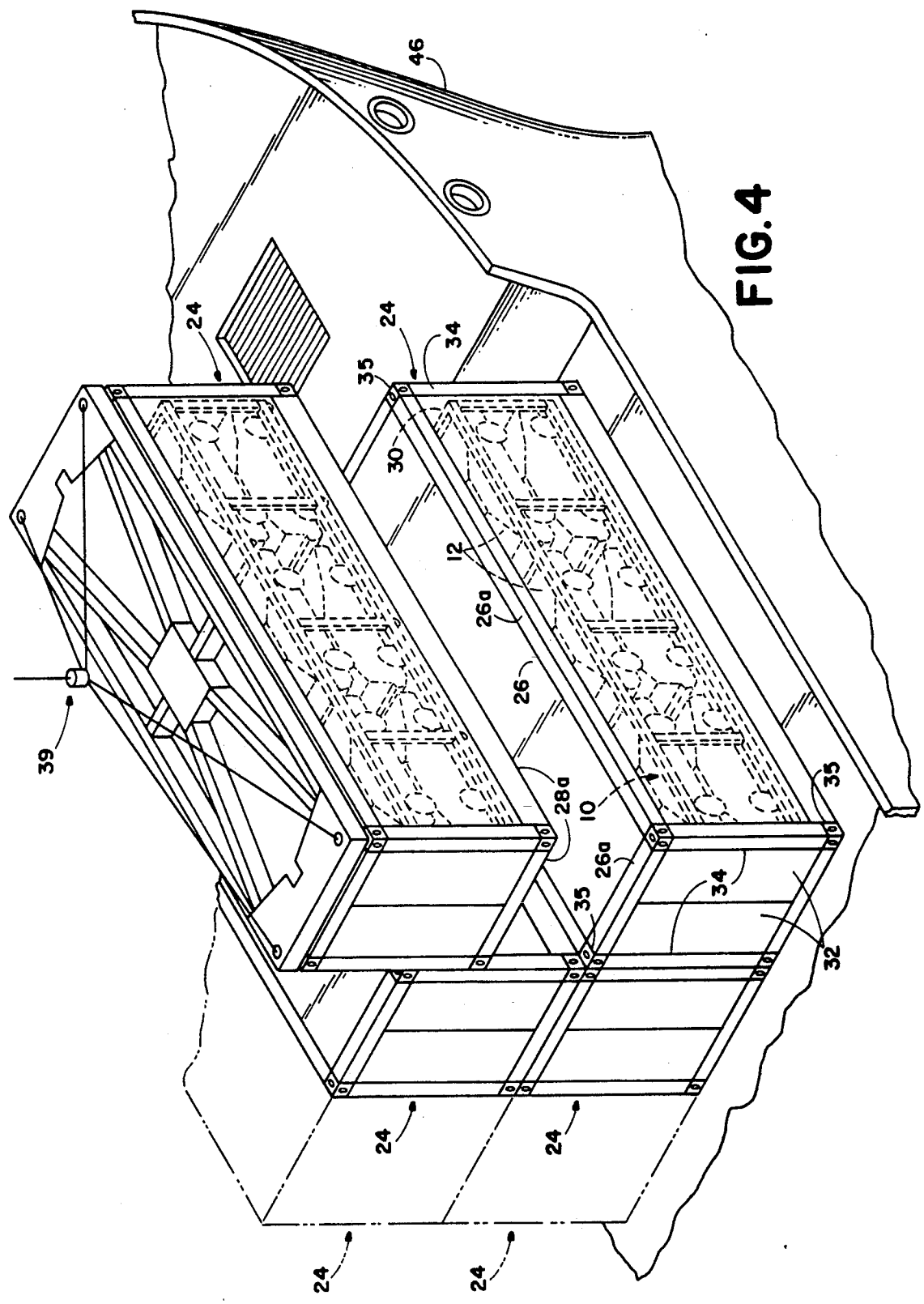
FIG. 4 is a partial perspective view of the open deck of a ship having standard, closed dry-cargo containers stacked atop one another, each container enclosing a respective vehicle-supporting frame having two tiers of vehicles secured thereto.

Although the open-sided nature of each frame 10 is necessary to facilitate the securing of the vehicles 12 in their vertically-spaced upper and lower positions physically isolated from each other as shown in FIG. 2, such open structure is unable to provide protection for the vehicles from external hazards such as weather, flying debris, seawater and the like, and lacks the rigidity to vertically support a similarly loaded frame placed on top of it. However, by matingly inserting each of the fully-loaded frames into a respective enclosure 24 after the frame has been loaded with the vehicles, both problems are solved. For example, with reference to FIG. 3, a pair of enclosures 24, each having a respective frame 10 and vertically-spaced vehicles 12 inside, can be stacked (e.g. by a hoist 39 as shown in FIG. 4) vertically one atop the other on a container-carrying railcar 40 of the type disclosed in Kaleta U.S. Pat. No. 4,624,188, which is incorporated herein by reference, and removably secured to the railcar 40 by means of end supports 42 and 44. Thus, even though the railcar 40 is equipped to carry its cargo only in a weather-exposed condition, the vehicles 12 are nevertheless protected from the external hazards of weather and flying debris. Moreover, even though the frames 10, because of their open structure, lack the rigidity by themselves to support the four tiers of vehicles 12 shown in FIG. 3, such high-stacking of the vehicles is nevertheless obtainable because the posts and closed sidewalls of the enclosures 24 provide the necessary rigidity to make the numerous tiers structurally feasible.

With reference to FIG. 4, a similar high-stacking arrangement is shown removably secured to the upper deck of a ship 46 by means of the bottom corner fittings 35, or by suitable tie-down cables or retainer flanges or brackets (not shown) affixed to the deck to resist transverse sliding of the enclosures 24 in heavy seas. The enclosures 24 provide protection for the vehicles 12 from weather and seawater, which protection is normally available to shipboard vehicles only if they are in the hold of the ship. In the past, neither this degree of high-stacking, nor this degree of protection, of vehicles on the exposed upper deck of a ship has been possible.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An elongate, vehicle-supporting frame comprising:
   (a) a pair of transversely spaced, elongate upright sides capable of supporting a wheeled vehicle between said sides;
   (b) respective elongate tension members suspended substantially vertically from respective support positions on each of said elongate upright sides, said respective support positions being spaced longitudinally along said upright sides;
   (c) respective front and rear vehicle wheel support members supportably mounted on said tension members; and
   (d) means associated with said tension members for enabling said respective support positions, from which said tension members are suspended on each of said elongate upright sides, to be moved selectively longitudinally along said upright sides, and for enabling said vehicle wheel support members to be pivoted independently of each other relative to said upright sides about respective axes extending transversely between said upright sides.

2. The apparatus of claim 1 wherein each of said tension members is a rigid member.

3. The apparatus of claim 1 wherein each of said vehicle wheel support members is movable vertically along a respective tension member.

4. The apparatus of claim 1 wherein each of said vehicle wheel support members extends transversely from a respective tension member suspended from one of said upright sides to another respective tension member suspended from the other of said upright sides.

5. An elongate, vehicle-supporting frame comprising:
   (a) a pair of transversely spaced, elongate upright sides capable of supporting a wheeled vehicle between said sides;
   (b) respective front and rear vehicle wheel support members supportably connected movably to said elongate upright sides so as to be selectively movable independently of each other both longitudinally and vertically relative to said elongate upright sides, and extending transversely between said upright sides so that each of said vehicle wheel support members interconnects said upright sides.

6. The apparatus of claim 5 wherein each of said upright sides has respective tension members suspended substantially vertically therefrom and wherein said vehicle wheel support members are supportably connected to said tension members.

7. The apparatus of claim 6 wherein each of said vehicle wheel support members is movable vertically along a respective tension member.

8. The apparatus of claim 6 wherein each of said tension members is suspended from a respective support position on one of said upright sides, each said support position being movable longitudinally along the respective upright side.

9. The apparatus of claim 6 wherein each of said tension members is a rigid member.

* * * * *